US010591838B2

(12) United States Patent
Kagan et al.

(10) Patent No.: US 10,591,838 B2
(45) Date of Patent: Mar. 17, 2020

(54) ELECTROSTATIC INK COMPOSITIONS

(71) Applicant: HP Indigo B.V., Amstelveen (NL)

(72) Inventors: Olga Kagan, Nes Ziona (IL); Danny Feldman, Nes Ziona (IL); Rada Nuchimov, Nes Ziona (IL); Yaron Grinwald, Nes Ziona (IL); Shiran Zabar, Nes Ziona (IL); Gleb Romantcov, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/066,381

(22) PCT Filed: Mar. 18, 2016

(86) PCT No.: PCT/EP2016/056051
§ 371 (c)(1),
(2) Date: Jun. 27, 2018

(87) PCT Pub. No.: WO2017/157473
PCT Pub. Date: Sep. 21, 2017

(65) Prior Publication Data
US 2019/0016907 A1    Jan. 17, 2019

(51) Int. Cl.
*G03G 9/12* (2006.01)
*C09D 11/52* (2014.01)
*G03G 9/13* (2006.01)
*G03G 9/08* (2006.01)
*C09D 11/50* (2014.01)
(Continued)

(52) U.S. Cl.
CPC .............. *G03G 9/122* (2013.01); *C09D 11/52* (2013.01); *G03G 9/0804* (2013.01); *G03G 9/131* (2013.01); *C09D 11/037* (2013.01); *C09D 11/17* (2013.01); *C09D 11/50* (2013.01)

(58) Field of Classification Search
CPC .... G03G 9/0928; G03G 9/122; G03G 9/0804; G03G 9/131
See application file for complete search history.

(56) References Cited

U.S. PATENT DOCUMENTS 3,668,127 A * 6/1972 Machida ................ G03G 9/131
430/114
3,951,836 A * 4/1976 Matkan ............... G03G 9/0914
430/114
5,270,445 A    12/1993 Hou
(Continued)

FOREIGN PATENT DOCUMENTS

WO    2014184481    11/2014

OTHER PUBLICATIONS

DuPont BYNEL 2002, DuPont Packaging and Industrial Polymers, 4 pages (Aug. 2010).*
(Continued)

*Primary Examiner* — Christopher D Rodee
(74) *Attorney, Agent, or Firm* — HP Inc. Patent Department

(57) ABSTRACT

Disclosed herein is an electrostatic ink composition. The composition may comprise a carrier liquid, which has suspended therein: thermochromic pigment particles having a layer of thermoplastic resin thereon. Method for forming electrostatic ink composition and a substrate having the electrostatic ink composition printed thereon are also disclosed herein.

17 Claims, 2 Drawing Sheets

(51) Int. Cl.
  *C09D 11/17* (2014.01)
  *C09D 11/037* (2014.01)

(56) References Cited

U.S. PATENT DOCUMENTS

| | | | |
|---|---|---|---|
| 5,567,564 | A | 10/1996 | Ziolo |
| 5,690,857 | A | 11/1997 | Osterried et al. |
| 5,721,059 | A | 2/1998 | Kito et al. |
| 6,048,387 | A * | 4/2000 | Shibahashi ............ B41M 5/305 106/31.21 |
| 6,759,099 | B2 * | 7/2004 | Lodge .................. A47G 19/025 427/258 |
| 8,221,955 | B2 * | 7/2012 | Victor .................... G03G 9/125 430/115 |
| 8,361,587 | B2 | 1/2013 | Cella et al. |
| 8,709,973 | B2 | 4/2014 | Kwan |
| 2003/0122113 | A1 | 7/2003 | Senga et al. |
| 2012/0107579 | A1 | 5/2012 | Grinwald et al. |
| 2013/0075675 | A1 | 3/2013 | Krutak et al. |
| 2013/0177703 | A1 * | 7/2013 | Clayton ................ C09D 11/50 427/145 |
| 2017/0274698 | A1 * | 9/2017 | Ono ........................ C09K 9/02 |

OTHER PUBLICATIONS

Diamond, Arthur S. (ed) Handbook of Imaging Materials, New York: Marcel-Dekker, Inc. (2002) pp. 242-247, 254-257.*
"Thermochromic Free Flowing Powder Technical Data" LCR Hallcrest (2 pages) (Year: 2017).*
"ChromaZone® FF Powder Technical Data Sheet" TMC Hallcrest (2 pages) (Year: 2017).*
International Search Report dated Nov. 14, 2016 for PCT/EP2016/056051, Applicant Hewlett-Packard Indigo B.V.

* cited by examiner

ELECTROSTATIC INK COMPOSITIONS

BACKGROUND

Electrostatic printing processes can involve creating an image on a photoconductive surface, applying an ink having charged particles to the photoconductive surface, such that they selectively bind to the image, and then transferring the charged particles in the form of the image to a print substrate.

The photoconductive surface may be on a cylinder and may be termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

BRIEF DESCRIPTION OF THE FIGURES

FIG. 1A shows thermochromic microcapsules, before precipitation of thermoplastic resin on them.

DETAILED DESCRIPTION

Figure 1A:
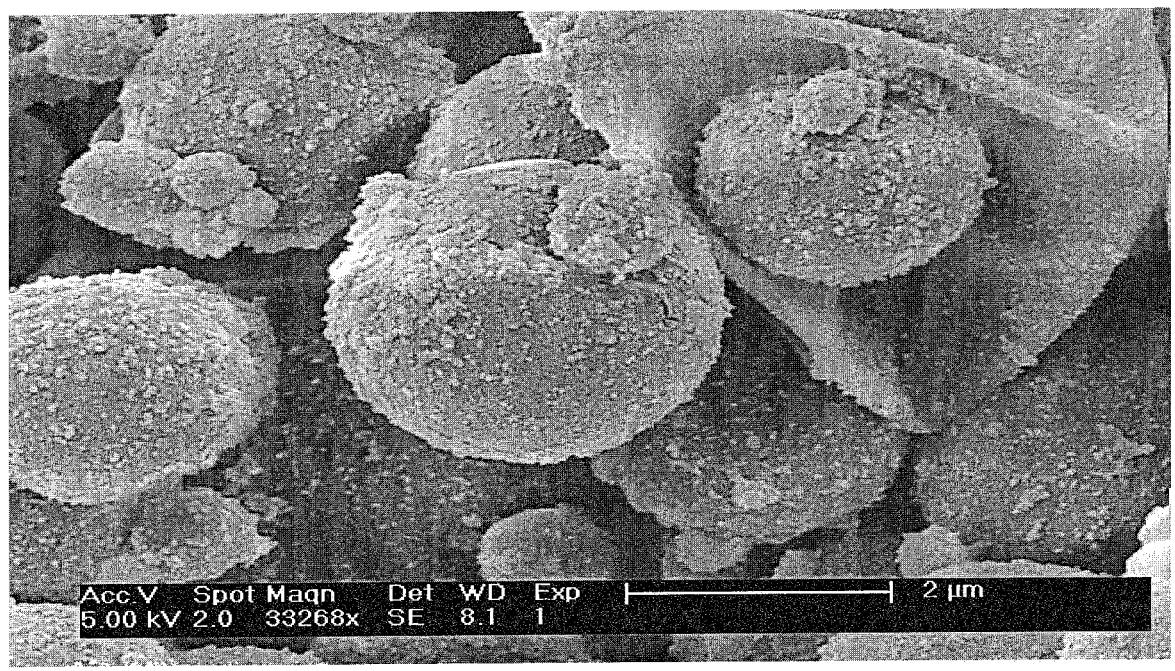
FIG. 1A shows a scanning electron micrograph (SEM) image of an example of a thermochromic pigment particles for use in forming the electrostatic ink composition as described herein. In particular.
Figure 1B:
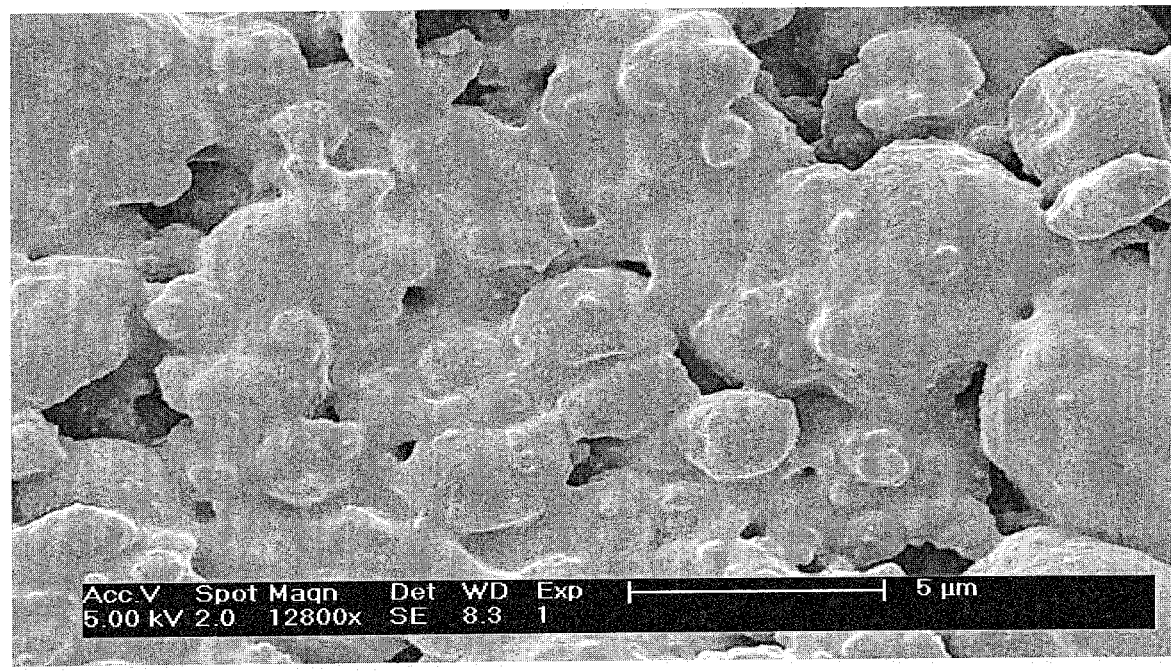
FIG. 1B shows a scanning electron micrograph (SEM) image of the thermochromic pigment particles of FIG. 1A after having thermoplastic resin precipitated onto them.
Figure 2:
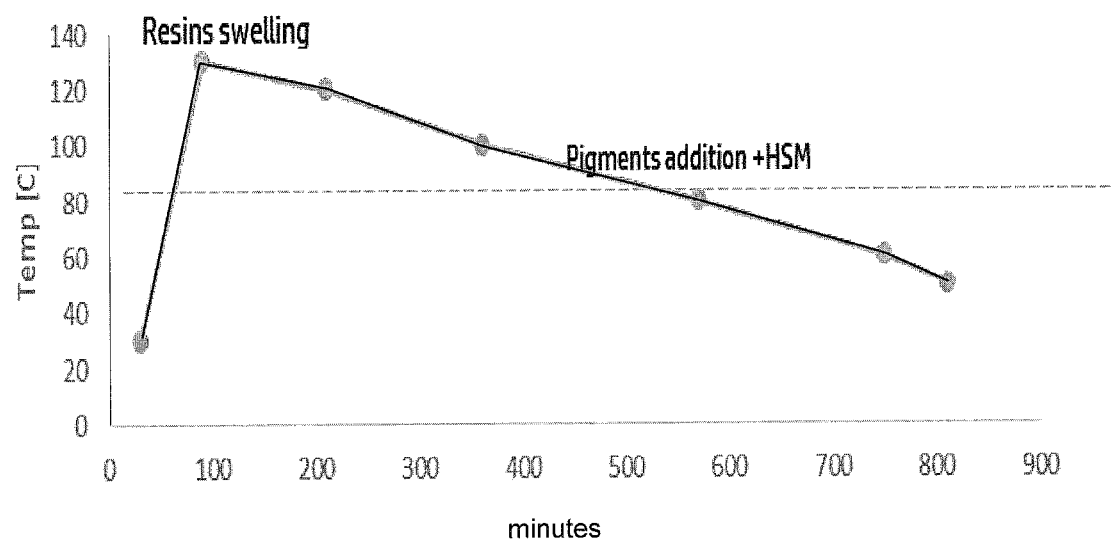
FIG. 2 shows an example temperature vs. time (in minutes) profile of an example of a method as described herein, in which thermoplastic resin is precipitated by temperature reduction in a carrier liquid onto thermochromic pigment particles. This is described in more detail in the Examples below. In this example, thermochromic microcapsules (ChromaZone FF 31° C.) were added above the resin cloud point of about 90° C.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, thermoplastic resin, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise thermochromic pigment particles having a thermoplastic resin thereon. The electrostatic ink composition may be a liquid electrostatic ink composition, in which the pigment particles having resin thereon are suspended in a carrier liquid. The pigment particles having resin thereon will typically be charged or capable of developing charge in an electric field, such that they display electrophoretic behaviour. A charge director may be present to impart a charge to the pigment particles having resin thereon.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

As used herein, "cloud point" refers to the temperature at which, on heating, a dispersion comprising the carrier liquid in which the resin is suspended becomes clear and/or at which, on cooling, a dispersion becomes cloudy (i.e., hazy). The cloud point can be measured by taking a transparent vial comprising a resin in a carrier liquid (without any pigment present). If the electrostatic ink composition comprises more than one type of polymer in the resin, the test of cloud point is of the combination of polymers in the same proportions as they are contained in the electrostatic ink composition. The vial is heated until only a single phase is visible. The mixture is then cooled at a rate of 2-5° C./hour (in some examples 2° C./hour) and the cloud point is the point at which the mixture starts to become cloudy (i.e., hazy). A thermometer is present in the mixture during the process to allow recording of the cloud point. The measurement of cloud point is taken at standard pressure (an absolute pressure of 100 kPa).

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g., an electric field having a field gradient of 50-400V/µm, or more, in some examples 600-900V/µm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, and unless stated otherwise, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided an electrostatic ink composition. The electrostatic ink composition may comprise:
 a carrier liquid, which has suspended therein:
 thermochromic pigment particles having a layer of thermoplastic resin thereon.

In another aspect there is provided a method of producing an electrostatic ink composition. The method may comprise:
 providing a carrier liquid having suspended or dissolved therein a thermoplastic resin and a thermochromic pigment;
 effecting precipitation of the thermoplastic resin onto the thermochromic pigment.

In another aspect, there is provided a substrate having electrostatically printed thereon:
 a thermochromic pigment embedded within a layer of thermoplastic resin.

Thermochromic pigment particles have been used in a wide range of applications, but their potential use has been restricted in some areas, since they can be destroyed or degraded by severe mechanical processing and/or exposure to prolonged heating (for example, to 200° C.).

Many electrostatic printing inks are produced by grinding a pigment with a resin, sometimes in the presence of a liquid carrier, often at raised temperatures. However, this process is unsuited to the use of thermochromic microcapsules, which have a tendency to break, causing the loss of the reversibility of the thermochromic reaction and possibly their entire thermochromic capability. The present inventors have found that examples of the method as described herein avoid or at least mitigate at least one of the difficulties described above. They have found that examples of the method are successful in creating thermochromic inks suitable for electrostatic printing.

Thermochromic Pigment

Thermochromic pigments are pigments or pigment compositions that change colour when they are heated up or cooled down. In some examples, the colour change is reversible. In other examples, the colour change is irreversible. A thermochromic pigment may comprise a liquid crystal formulation or a leuco dye. In some examples, a thermochromic pigment may comprise a liquid crystal formulation or a leuco dye encapsulated within a microcapsule.

Thermochromic liquid crystals change colour with temperature as a result of a change in the separation of the liquid crystal particles, causing interference of the reflected light. The separation of the liquid crystal particles may increase or decrease with temperature increases. The colour change with temperature for a thermochromic liquid crystal may be from black to a specific colour or from black through the full or part of the colour spectrum, gradually passing through the different colours as the temperatures changes, in some examples with the colour returning to black again.

A leuco dye is a dye which can switch between two chemical forms, one of which is a different colour to the other. A leuco dye may be colourless in one form and coloured in the other. In some examples, a leuco dye may be a lighter colour in one form than in the other.

A leuco dye may switch between chemical forms as a result of temperature or pH changes. In some examples, the thermochromic pigment particles comprise a pH sensitive leuco dye (halochromic), that is, a dye that switches chemical forms as a result of a change in pH. To effect thermochromism from halochromic leuco dyes, the thermochromic pigment may comprise the leuco dye and colour developer, which may be a proton donor or a proton acceptor. The interaction between the leuco dye and the colour developer is temperature dependent. In some examples, a solvent may be present. In some examples, the interaction between the leuco dye and colour developer is temperature dependent as a result of a change in the phase of the solvent, in some examples from a solid to a liquid.

In some examples, the thermochromic pigment comprises a colour former, a colour developer and a solvent encapsulated within a polymeric shell, and, in some examples, the colour former comprises a leuco dye. In some examples, the thermochromic pigment particles are microcapsules, i.e. capsules having a diameter of less than 1 mm, in some examples less than 500 µm, in some examples less than 200 µm, in some examples less than 100 µm, in some examples less than 50 µm, in some examples less than 20 µm, in some examples less than 10 µm. The diameter of a microcapsule may be measured, for example, by scanning electron microscropy. In some examples, the microcapsules comprise a polymeric shell encapsulating a liquid crystal formulation. In some examples, the microcapsules comprise a polymeric shell encapsulating a leuco dye. In some examples, the microcapsules comprise a polymeric shell encapsulating a leuco dye and a colour developer. In some examples, the microcapsules comprise a polymeric shell encapsulating a leuco dye and a proton donor. In some examples, the microcapsules comprise a polymeric shell encapsulating a leuco dye and a proton acceptor. In some examples, the microcapsules comprise a polymeric shell encapsulating a leuco dye, a colour developer and a solvent. In some examples, the microcapsules comprise a polymeric shell encapsulating a leuco dye, a proton donor and a solvent. In some examples, the microcapsules comprise a polymeric shell encapsulating a leuco dye, a proton acceptor and a solvent.

In some examples, the leuco dye comprises a species selected from a spirolactone, a fluoran, a spiropyran and fulgides. In some examples, the proton donor is a weak acid developer, which may be selected from bisphenol A, 1,2,3-triazole derivative (e.g. 1,2,3-benzotriazole) and 4-hydroxycoumarin. In some examples the solvent is a low-melting fatty acid, amide or alcohol.

In some examples the leuco dye may be an electron donating or proton-accepting compound, which may be selected from the following compound classes:
(i) fluorans, such as 2'-((2-chlorophenyl)amino-6'-(dibutylamino)-spiro(isobenzofuran-1(3H),9'(9H)xanthene)-3-on; 3-diethylamino-6-methyl-7-chlorofluoran; 3-diethylaminobenzo(a)-fluoran; 3,6-diphenylaminofluoran; 3-amino-5-methylfluoran; 2-methyl-3-amino-6,7-dimethylfluoran; 2-bromo-6-cyclohexylaminofluoran; and 6'-(ethyl(4-methylphenyl)amino)-2'-(N-methylphenylamino)-spiro(isobenzofuran-1(3H),9'(9H)xanthene)-3-on;
(ii) diarylphthalides, such as Crystal violet lactone and Malachite green lactone;
(iii) polyarylcarbinols, such as Michler's hydrol, Crystal violet carbinol and Malachite green carbinol;
(iv) leuco auramines, such as N-(2,3-dichlorophenyl)leuco auramine, N-benzoylauramine and N-acetylauramine;
(v) rhodamine beta lactams, such as Rhodamine beta lactam;
(vi) indolines, such as 2-(phenyliminoethylidene)-3,3-dimethylindoline; and
(vii) spiropyranes, such as N-3,3-trimethylindolinobenzospiropyrane and 8-methoxy-N-3,3-trimethylindolinobenzospiropyrane.

In some examples, the colour developer may be an electron-accepting or proton-donor compound, which may be selected from the following
(i) phenols, such as bisphenol A, p-phenylphenol, dodecylphenol, o-bromophenol, ethyl p-oxybenzoate, methyl gallate and phenol resin;
(ii) metal phenolates, such as Na, K, Li, Ca, Zn, Al, Mg, Ni, Co, Sn, Cu, Fe, Ti, Pb, Mo and the like metal salts of phenol;
(iii) aromatic carboxylic acids and C2-C5 aliphatic carboxylic acids, such as phthalic acid, benzoic acid, acetic acid and propionic acid;
(iv) metal carboxylates, such as sodium oleate, zinc salicylate and nickel benzoate;
(v) acidic phosphate esters and metal salts thereof, such as butyl acid phosphate, 2-ethylhexyl acid phosphate, dodecyl acid phosphate, di-O-tolyl phosphate, and Na, K, Li, Ca, Zn, Al, Mg, Ni, Co, Sn, Fe, Ti, Pb, Mo and the like metal salts of said esters;
(vi) triazole compounds, such as 1,2,3-triazole and 1,2,3-benzotriazole;
(vii) thiourea and derivatives thereof, such as diphenylthiourea and di-o-toluylurea;
(viii) halohydrines, such as 2,2,2-trichloroethanol; 1,1,1-tribromo-2-methyl-2-propanol; and N-3-pyridyl-N'-(1-hydroxy-2,2,2-trichloroethyl)urea; and
(ix) benzothiazoles, such as 2-mercaptobenzothiazole, 2-(4'-morpholinodithio)-benzothiazole, N-tert-butyl-2-benzothiazolyl sulpheneamide, and 2-mercaptobenzothiazole zinc salt.

In some examples, the solvent may be selected from the following:
(i) alcohols, such as n-cetyl alcohol, n-octyl alcohol, cyclohexyl alcohol and hexyleneglycol;
(ii) esters, such as myristate esters, laurate esters and dioctyl phthalate;
(iii) ketones, such as methylhexylketone, benzophenone and stearone;
(iv) ethers, such as butyl ether, diphenyl ether and distearyl ether;
(v) acid amides, such as oleic acid amides, stearamide, N-octyl-lauramide and capronanilide;
(vi) fatty acids having at least 6 carbon atoms, such as lauric acid, stearic acid and 2-oxymyristic acid;
(vii) aromatic compounds, such as diphenylmethane, dibenzyltoluene, propyldiphenyl, isopropylnaphthalene, 1,1,3-trimethyl-3-tolylindan and dodecylbenzene;
(viii) thiols, such as n-decyl mercaptane, n-myristyl mercaptane, n-stearyl mercaptane, isocetyl mercaptane and dodecylbenzyl mercaptane
(ix) sulfides, such as di-n-octylsulfide, di-n-decylsulfide, diphenylsulfide, diethylphenylsulfide and dilauryldithiopropionate;
(x) disulfides, such as di-n-octyl disulfide, di-n-decyl disulfide, diphenyl disulphide and dinaphthyl disulphide;
(xi) sulfoxides, such as diethylsulfoxide, tetramethylenesulfoxide and diphenylsulfoxide;
(xii) sulfones, such as diethylsulfone, dibutylsulfone, diphenylsulfone and dibenzylsulfone;

(xiii) azomethines, such as benzylidene laurylamine, p-methoxybenzylidene laurylamine and benzylidene p-anisidine; and (xiv) fatty acid primary amines, such as oleic acid stearylamine, stearic acid myristylamine and behenic acid stearylamine.

In some examples, an increase in temperature changes the thermochromic pigment particles from coloured to colourless.

The thermochromic pigment particle may comprise a polymeric shell that contains within its core the leuco dye, the colour developer (e.g. a proton donor or electron acceptor) and the solvent. The polymeric shell comprises a polymer different from the thermoplastic resin. The polymeric shell may comprise a polymer having a lower melt flow rate (in terms of a lower amount of g/min) than the thermoplastic resin. The polymeric shell may comprise a melamine formaldehyde, an epoxy resin, a urethane resin, urea resin or other suitable polymeric material.

Thermochromic materials are available commercially, e.g. thermochromic microcapsules with the trade name Chromazone Powder from suppliers such as TMC Hallcrest.

The thermochromic pigment particle may be present in the method and/or electrostatic ink composition in an amount of from 10 wt % to 80 wt % of the total amount of resin and thermochromic pigment, in some examples 15 wt % to 80 wt %, in some examples 15 wt % to 60 wt %, in some examples 15 wt % to 50 wt %, in some examples 15 wt % to 40 wt %, in some examples 20 wt % to 400 wt % of the total amount of resin and thermochromic pigment, in some examples 35 wt % to 45 wt % of the total amount of resin and thermochromic pigment.

Thermoplastic Resin

The thermoplastic resin comprises a thermoplastic polymer. In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The thermoplastic resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg KOH/g or less or less, in some examples 180 mg KOH/g or less or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The thermoplastic resin may comprise a polymer, in some examples a polymer having acidic side groups, that has a melt flow rate of greater than about 100 g/10 minutes, in some examples about 120 g/10 minutes or more, in some examples about 150 g/10 minutes or more, in some examples about 200 g/10 minutes or more, in some examples 300 g/10 minutes or more, in some examples 400 g/10 minutes or more, in some examples 425 g/10 minutes or more, in some examples 445 g/10 minutes or more, in some examples 450 or more g/10 minutes.

The polymer having acidic side groups can have a melt flow rate of about 100 g/10 minutes to about 600 g/10 minutes, in some examples about 150 g/10 minutes to about 600 g/10 minutes, in some examples about 200 g/10 minutes to 600 g/10 minutes, in some examples 300 g/10 minutes to 600 g/10 minutes, in some examples 350 g/10 minutes to 550 g/10 minutes, in some examples 400 g/10 minutes to 500 g/10 minutes, in some examples 425 g/10 minutes to 475 g/10 minutes, in some examples about 450 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer, in some examples from 11 wt % to about 20 wt % of the co-polymer.

The thermoplastic resin may comprise two different polymers having acidic side groups. The two polymers having acidic side groups may have different acidities, which may fall within the ranges mentioned above. The thermoplastic resin may comprise a first polymer having acidic side groups that has an acidity (in KOH/g) lower than that of the second polymer. The thermoplastic resin may comprise a first polymer having acidic side groups that has an acidity of from 10 mg KOH/g to 110 mg KOH/g, in some examples 20 mg KOH/g to 100 mg KOH/g, in some examples 30 mg KOH/g to 90 mg KOH/g, in some examples 50 mg KOH/g to 80 mg KOH/g, and a second polymer having acidic side groups that has an acidity of 110 mg KOH/g to 130 mg KOH/g.

The thermoplastic resin may comprise two different polymers having acidic side groups, the two polymers comprising a first polymer, which is a co-polymer of ethylene and methacrylic acid and a second polymer, which is a co-polymer of ethylene and acrylic acid.

The thermoplastic resin may comprise two different polymers having acidic side groups: a first polymer having acidic side groups that has a melt flow rate of greater than about 100 g/10 minutes, in some examples about 120 g/10 minutes or more, in some examples about 150 g/10 minutes or more, in some examples about 200 g/10 minutes or more, in some examples 300 g/10 minutes or more, in some examples 400 g/10 minutes or more, in some examples 425 g/10 minutes or more, in some examples 445 g/10 minutes or more, in some examples 450 g/10 minutes. The first polymer having acidic side groups may have a melt flow rate of about 100 g/10 minutes to about 500 g/10 minutes, in some examples about 150 g/10 minutes to about 500 g/10 minutes, in some examples about 150 g/10 minutes to 475 g/10 minutes, in some examples 250 g/10 minutes to 475 g/10 minutes, in some examples 300 g/10 minutes to 475 g/10 minutes, in some examples 400 g/10 minutes to 475 g/10 minutes, in some examples 400 g/10 minutes to 455 g/10 minutes. The first polymer having acidic side groups may comprise Nucrel 599 (sold by E. I. du PONT). In some examples, the second polymer having acidic side groups may have a melt viscosity of 15000 poise or less, in some examples a melt viscosity of 10000 poise or less, in some examples 1000 poise or less; said polymer may be a polymer having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

An example of the first polymer is Nucrel 599 (from DuPont), and example of the second polymer is AC-5120 (from Honeywell). The first and second polymers may be polymers having acidic side groups as described herein.

The ratio of the first polymer having acidic side groups to the second polymer having acidic side groups can be from about 100:1 to about 4:1. The ratio can be from about 50:1 to about 5:1, in some examples about 25:1 to about 10:1, in some examples about 20:1 to about 15:1, in some examples about 19:1.

If the thermoplastic resin comprises a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the thermoplastic resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and methacrylic acid, wherein methacrylic acid constitutes from 6 wt % to about 16 wt % of the co-polymer, in some examples from 8 wt % to 12 wt % of the co-polymer, in some examples from 9 wt % to 11 wt % of the co-polymer, in some examples 10 wt %; and (ii) a second polymer that is a co-polymer of ethylene and acrylic acid, wherein acrylic acid constitutes from 10 wt % to about 20 wt % of the co-polymer, in some examples from 12 wt % to about 18 wt % of the co-polymer, in some examples from 13 wt % to about 17 wt % of the co-polymer in some examples 15 wt % of the co-polymer.

The thermoplastic resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples 1 to 20 carbon atoms, in some examples 1 to 10 carbon atoms; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. In some examples, the first monomer constitutes 5% to 40% by weight of the co-polymer and the second monomer constituting 5% to 40% by weight of the co-polymer, and with the third monomer constituting the remaining weight of the co-polymer. In some examples, the first monomer constitutes 5% to 15% by weight of the co-polymer and the second monomer constitutes 5% to 15% by weight of the co-polymer, with the third monomer constituting the remaining weight of the co-polymer. In some examples, the first monomer constitutes 8% to 12% by weight of the co-polymer and the second monomer constitutes 8% to 12% by weight of the co-polymer, with the third monomer constituting the remaining weight of the co-polymer. In some examples, the first monomer constitutes about 10% by weight of the co-polymer and the second monomer constitutes about 10% by weight of the co-polymer, with the third monomer constituting the remaining weight of the co-polymer. The polymer may be selected from the Bynel® class of polymers, including Bynel 2022 and Bynel 2002, which are available from DuPont®.

The polymer having ester side groups may constitute 1% or more by weight of the total amount of the thermoplastic resin polymers in the liquid electrostatic ink composition and/or the ink composition electrostatically printed on the substrate, e.g. the total amount of the polymer or polymers having acidic side groups and polymer having ester side groups. The polymer having ester side groups may constitute 5% or more by weight of the total amount of the thermoplastic resin polymers in some examples 8% or more by weight of the total amount of the thermoplastic resin polymers in some examples 10% or more by weight of the total amount of the thermoplastic resin polymers in some examples 15% or more by weight of the total amount of the thermoplastic resin polymers in some examples 20% or more by weight of the total amount of the thermoplastic resin polymers in some examples 25% or more by weight of the total amount of the thermoplastic resin polymers in some examples 30% or more by weight of the total amount of the thermoplastic resin polymers in some examples 35% or more by weight of the total amount of the thermoplastic resin polymers in the liquid electrostatic ink composition and/or the ink composition electrostatically printed on the substrate. The polymer having ester side groups may constitute from 5% to 50% by weight of the total amount of the thermoplastic resin polymers in the liquid electrostatic composition and/or the ink composition electrostatically printed on the substrate, in some examples 10% to 40% by weight of the total amount of the thermoplastic resin polymers in the liquid electrostatic composition and/or the ink composition electrostatically printed on the substrate, in some examples 5% to 30% by weight of the total amount of the thermoplastic resin polymers in the liquid electrostatic composition and/or the ink composition electrostatically printed on the substrate, in some examples 5% to 15% by weight of the total amount of the thermoplastic resin polymers in the liquid electrostatic composition and/or the ink composition electrostatically printed on the substrate, in some examples 15% to 30% by weight of the total amount of the thermoplastic resin polymers in the liquid electrostatic composition and/or the ink composition electrostatically printed on the substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), the Lotader family of toners (e.g. Lotader 2210, Lotader, 3430, and Lotader 8200 (sold by Arkema)), the A-C family of resins (e.g., A-C 5120 (sold by Honeywell)).

The resin can constitute about 5 to 90%, in some examples about 50 to 80%, by weight of the solids of the liquid electrostatic composition and/or the ink composition electrostatically printed on the substrate. The resin can constitute about 60 to 95%, in some examples about 70 to 95%, by weight of the solids of the liquid electrostatic composition and/or the ink composition electrostatically printed on the substrate, and, in some examples, the remaining weight percent is the thermochromic pigment, a charge director (if present), and, in some examples, any other additives that may be present.

Carrier Liquid

In some examples, the composition comprises coated pigment particles which are formed in and/or dispersed in or suspended in a carrier fluid or carrier liquid. Before application to the print substrate in the electrostatic printing process, the electrostatic ink composition may be in liquid form; and may comprise a carrier liquid in which is suspended pigment particles coated with the thermoplastic resin.

Generally, the carrier liquid acts as a solvent in preparing the coated pigment particles, and can also act as a dispersing medium for the other components in the resulting electrostatic ink composition. In one example, the carrier liquid is a liquid which does not dissolve the polymer resin at room temperature. In one example, the carrier liquid is a liquid which dissolves the polymer resin at elevated temperatures. For example, the thermoplastic resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar- K™, Isopar-V™, Norpar 12™, Norpar 13™, Norpar 15™, Exxol D40™, Exxol D80™, Exxol D100™ Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™, Nisseki Isosol 300™, Nisseki Isosol 400™, AF-4™, AF-S™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

In the example in which the carrier liquid is acting as a solvent during preparation of the liquid electrostatic ink composition comprising coated pigment particles, the carrier liquid can constitute about 20% to 99.5% by weight of the composition, in some examples 50% to 99.5% by weight of the composition. In the example in which the carrier liquid is acting as a solvent during preparation of coated pigment particles, the carrier liquid may constitute about 40 to 90% by weight of the composition. In the example in which the carrier liquid is acting as a solvent during preparation of coated pigment particles, the carrier liquid may constitute about 60% to 80% by weight of the composition. In the example in which the carrier liquid is acting as a solvent during preparation of coated pigment particles, the carrier liquid may constitute about 90% to 99.5% by weight of the composition, in some examples 95% to 99% by weight of the composition.

Before printing, the carrier liquid can constitute about 20% to 99.5% by weight of the electrostatic ink composition, in some examples 50% to 99.5% by weight of the electrostatic ink composition. Before printing, the carrier liquid may constitute about 40 to 90% by weight of the electrostatic ink composition. Before printing, the carrier liquid may constitute about 60% to 80% by weight of the electrostatic ink composition. Before printing, the carrier liquid may constitute about 90% to 99.5% by weight of the electrostatic ink composition, in some examples 95% to 99% by weight of the electrostatic ink composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Charge Director and Charge Adjuvant

The electrostatic ink composition and/or the ink composition printed on the print substrate may comprise a charge director. A charge director can be added to an electrostatic composition to impart a charge of a desired polarity and/or maintain sufficient electrostatic charge on the particles of an electrostatic ink composition. The charge director may comprise ionic compounds, including, but not limited to, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™) polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula $[R_a—O—C(O)CH_2CH(SO_3^-)C(O)—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise a component selected from (i) soya lecithin, (ii) a barium sulfonate salt, such as basic barium petronate (BPP), and (iii) an isopropyl amine sulfonate salt. The charge director may comprise all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of the electrostatic ink composition and/or ink composition printed on the print substrate. The charge director can constitute about 0.001 to 0.15% by weight of the solids of the liquid electrostatic ink composition and/or ink composition printed on the print substrate, in some examples 0.001 to 0.15%, in some examples 0.001 to 0.02% by weight of the solids of the liquid electrostatic ink composition and/or ink composition printed on the print substrate. The charge director may be present in an amount of 1 mg to 100 mg per g of the solids of the electrostatic ink composition (which will, for brevity, be termed 'mg/g by weight solids'), in some examples 5 mg/g to 75 mg/g by weight solids, in some examples 10 mg/g to 50 mg/g by weight solids, in some examples 10 mg/g to 40 mg/g by weight solids, in some examples 15 mg/g to 35 mg/g by weight solids, in some examples 15 mg/g to 35 mg/g by weight solids, in some examples 20 mg/g to 30 mg/g by weight solids, in some examples 25 mg/g by weight solids.

The liquid electrostatic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrostatic ink composition and/or ink composition printed on the print substrate. The charge adjuvant can constitute about 0.5 to 4% by weight of the solids of the liquid electrostatic ink composition and/or ink composition printed on the print substrate. The charge adjuvant can constitute about 1 to 3% by weight of the solids of the liquid electrostatic ink composition and/or ink composition printed on the print substrate.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method of Producing the Liquid Electrostatic Ink Composition

In some examples, the method of producing a thermochromic liquid electrostatic ink composition includes providing a carrier liquid having suspended or dissolved therein a thermoplastic resin and a thermochromic pigment. The thermochromographic pigment may be termed pigment particles herein.

The precipitation may effected by temperature reduction. In some examples, the carrier liquid and thermoplastic resin are heated to at least the cloud point prior to addition of the thermochromic pigment. In some examples, the precipitation is effected by cooling to below the cloud point. In some examples, the temperature reduction occurs at a rate less than or equal to 50° C./h. In some examples, high shear mixing is performed during and/or after the precipitation.

In some examples, the method of producing a thermochromic liquid electrostatic ink composition involves heating a dispersion of a thermoplastic resin in a carrier fluid to dissolve the thermoplastic resin. In some examples, the thermoplastic resin is insoluble in the carrier fluid at room temperature (e.g. at 25° C., and 'insoluble' in the amount present in the fluid to the extent that it does not appear as a single phase) but soluble in the carrier fluid at elevated temperatures (i.e. such that a single phase does form), for example at a temperature of at least 50° C., for example at a temperature of at least 60° C., for example at a temperature of at least 70° C., for example at a temperature of at least 80° C., for example at a temperature of at least 90° C., for example at a temperature of at least 100° C., for example at a temperature of at least 110° C., for example at a temperature of at least 120° C. The dispersion of the thermoplastic resin in the carrier fluid may be heated to any of the above stated temperatures for sufficient time until the polymer resin has dissolved. Dissolution may be confirmed by the carrier fluid appearing clear and homogenous, i.e. a single phase. In some examples, the dispersion of polymer resin in the carrier fluid may be mixed at a rate of less than 100 rpm, for example less than 50 rpm, for example less than 20 rpm, for example less than 10 rpm until dissolution is complete. In some examples, the dispersion of polymer resin in the carrier fluid may be mixed at a rate of from 0.1 to 100 rpm, for example 0.5 to 50 rpm, for example 0.5 to 20 rpm, for example 0.5 to 10 rpm until dissolution is complete. In some examples, heating a dispersion of polymer resin in carrier fluid causes the polymer resin to swell with carrier fluid. In some examples, the dispersion of polymer resin in carrier fluid is heated to swell the polymer resin. Swelling of the polymer resin allows better encapsulation of the pigment particle.

In some examples, the pigment particles may be suspended in the carrier fluid before any cooling occurs, for example at the temperature at which dissolution of the polymer resin in the carrier fluid was carried out. In some examples, the carrier fluid may be cooled to an intermediate temperature before the pigment particles are suspended in the carrier fluid. The intermediate temperature may be any temperature above the cloud point of the solution comprising the carrier fluid and the dissolved polymer resin. The cloud point of any given carrier fluid-polymer resin system can be readily determined by heating and slowly cooling the solution and is the temperature at which dissolved solids begin to precipitate, giving a phase separation and a cloudy or turbid appearance. In some examples, the solution comprising the carrier fluid and the dissolved polymer resin is cooled to at least 2° C., for example at least 3° C., for example at least 4° C., for example at least 5° C., for example at least 6° C., for example at least 7° C., for example at least 8° C., for example at least 9° C., for example at least 10° C. above the cloud point before the pigment particle is suspended in the carrier fluid.

In some examples, the pigment particles are mixed into the solution of the polymer resin dissolved in the carrier fluid at a stirring rate of 100 rpm or less, for example 90 rpm or less, for example 80 rpm or less, for example 70 rpm or less, for example 60 rpm or less, for example 50 rpm or less, for example 20 rpm or less, for example 10 rpm or less, to ensure complete dispersion before the precipitation of the polymer resin is effected. The stirring at this rate may be carrier out for a period of at least 1 minute, e.g. at least 10 minutes, e.g. at least 20 minutes, or in some examples a period of from 1 minute to 3 hours, in some examples 20 minutes to 3 hours, in some examples from 40 minutes to 2 hours, in some examples about an hour. This stirring may all be carried out above the cloud point of the resins in the carrier liquid. This allows the resin to swell, which aids in its precipitation onto the pigment particles.

The precipitation is effected by controlling the cooling of the system by any method such that solubility of the resin in the carrier fluid is reduced and precipitation of the resin occurs. In some examples, the temperature of the carrier fluid is lowered through a controlled cooling process at a given rate. For example, after addition of the pigment particles, the temperature of the carrier fluid may be lowered at a rate of 20° C. or less per hour, for example 15° C. or less per hour, for example 12° C. or less per hour, for example 10° C. or less per hour, for example 8° C. or less per hour, for example 6° C. or less per hour, for example 5° C. or less per hour.

In some examples, precipitation is effected through controlled cooling through the cloud point of the polymer resin-carrier fluid system. For example, the controlled cooling at a rate of 8° C. or less/hour (in some examples 6° C. or less/hour, in some examples 6° C. or less/hour) may be carried out beginning at a temperature of 5° C. above the cloud point of the solution and continued until a temperature of at least 5° C. below the cloud point of the solution. In some examples, once the temperature has been lowered in a controlled manner to at least 5° C. below the cloud point of the solution, the system is then cooled at an uncontrolled rate to room temperature.

In some examples, the effecting precipitation involves controlling cooling through addition of further carrier fluid at a controlled rate. For example, the further carrier fluid may be added at a rate of less than 10 cm$^3$/min, for example less than 9 cm$^3$/min, for example less than 8 cm$^3$/min, for example less than 7 cm$^3$/min, for example less than 6 cm$^3$/min, for example less than 5 cm$^3$/min, for example less than 4 cm$^3$/min, for example less than 3 cm$^3$/min. In some examples, a sufficient amount of additional carrier fluid is added at a controlled rate in order to effect phase separation, or effect precipitation. In some examples, once precipitation is complete, the system is cooled at an uncontrolled rate to room temperature.

In some examples, during and/or after precipitation, high shear mixing is performed on the carrier liquid, the thermochromic pigment particles and the resin during and/or after the precipitation. High shear mixing may involve stirring the carrier liquid, the thermochromic pigment particles and the resin at a speed of at least 500 rpm, in some examples a speed of at least 1000 rpm, in some examples a speed of at least 2000 rpm, in some examples a speed of at least 3000 rpm, in some examples a speed of at least 4000 rpm, in some examples a speed of at least 5000 rpm. High shear mixing may involve stirring the carrier liquid, the thermochromic pigment particles and the resin at a speed of from 500 rpm to 8000 rpm, in some examples a speed of from 1000 rpm to 7000 rpm, in some examples a speed of 3000 rpm to 7000 rpm, in some examples a speed of from 4000 rpm to 6000 rpm, in some examples a speed of about 5000 rpm. The stirrer used may be an overhead stirrer.

In some examples, the composition resulting from the precipitation of the resin from the carrier fluid is suitable for use as or is converted to an electrostatic ink composition, after the precipitation of the thermoplastic resin. The electrostatic ink composition may be a liquid toner composition. The electrostatic ink composition may comprise coated particles comprising the resin and the pigment particles. In some examples, a particle comprises pigment particles having a coating of the resin thereon. In some examples, the coating of resin on the pigment particles partially or completely encapsulates the pigment particles. In some examples, the electrostatic ink composition may comprise particles comprising the resin and the pigment particles, wherein at least some of the pigment particles are completely encapsulated by the coating of the resin. The particles may be capable of developing a charge from the nature of the resin, e.g. if the resin has acidic side groups, to become chargeable particles. In some examples, an electrostatic ink composition may comprise a charge director. In some examples, a charge director may be present in the carrier liquid before precipitation of the resin. In some examples, a charge director is added during or after precipitation of the resin. In some examples, a charge director is added to the composition resulting from the precipitation of the resin from the liquid carrier to convert it to an electrostatic ink composition.

In some examples, the pigment particles, excluding any coating thereon, constitute 50% or less by weight of the solids in the electrostatic ink composition or composition resulting from the method, which may be an electrostatic ink composition. In some examples, the pigment particles, excluding any coating thereon, constitute 40% or less by weight, in some examples 35% or less by weight, in some examples 30% or less by weight of the solids in the electrostatic ink composition or composition resulting from the method. In some examples, the pigment particles, including any coating thereon, constitute 1% or more by weight, in some examples 2% or more by weight, in some examples 4% or more by weight, in some examples 6% or more by weight by weight, in some examples 8% or more by weight, of the solids in electrostatic ink composition or composition resulting from the method, which may be an electrostatic ink composition. In some examples, the pigment particles, excluding any coating thereon, constitute from 1% to 50% or less by weight of the solids, in some examples 5% to 50% by weight of the solids, in some examples 10% to 40% by weight of the solids, in some examples 20% to 40% by weight of the solids, in some examples 25% to 35% by weight of the solids in the electrostatic ink composition or composition resulting from the method, which may be an electrostatic ink composition.

The present disclosure further relates to a liquid electrostatic ink composition producible in accordance with a method described herein.

In some examples, the composition resulting from the precipitation of the resin from the liquid carrier is suitable for use as or is converted to a liquid electrostatic ink composition.

In some examples, the liquid electrostatic ink composition may be formed using a pigment particle and a polymer resin as previously described. In one example, the electrostatic ink composition may comprise pigment particles coated with a polymer resin, wherein the polymer resin comprises acidic side groups as described previously. In one example, the electrostatic ink composition may comprise pigment particles coated with a polymer resin, wherein the polymer resin is or comprises a polymer having a melt flow rate as described previously.

In some examples, the electrostatic ink composition is produced directly from the methods described herein and is usable as a printing composition. In one example, the carrier fluid used in the resin precipitation process is or comprises the carrier fluid used for the pigment resin coated particles in a printing process. Using, in the precipitation step, a carrier fluid which is also useable as the carrier fluid in a printing process allows for a reduction in manufacturing complexity and thereby increases the efficiency of the process.

The present disclosure also relates to a method of electrostatic printing using an electrostatic ink composition as described herein, which may result from the method described herein, the electrostatic ink composition comprising resin-coated pigment particles, the method comprising:
  forming a latent electrostatic image on a surface;
  contacting the surface with the electrostatic ink composition, such that at least some of the particles adhere to the surface to form a developed toner image on the surface, and transferring the toner image to a print substrate, in some examples, via an intermediate transfer member.

The surface on which the latent electrostatic image is formed may be on a rotating member, e.g. in the form of a cylinder. The surface on which the latent electrostatic image is formed may form part of a photo imaging plate (PIP). The intermediate transfer member may be a rotating flexible member, which may be heated, e.g. to a temperature of from 80 to 130° C.

In another aspect, there is provided a substrate having electrostatically printed thereon:
  a thermochromic pigment embedded within a layer of thermoplastic resin.

A charge director may embedded within the layer of thermoplastic resin. The charge director may be as described herein. The thermochromic pigment and the thermoplastic resin may be as described herein. The layer of thermoplastic resin having the thermochromic pigments therein may be formed by the heating and coalescence of the thermoplastic resin on the thermochromic pigment particles during the printing process.

The substrate may be a print substrate and may be or comprise a cellulosic print substrate such as paper. The cellulosic print substrate may be or comprise an uncoated cellulosic print substrate, i.e. absent of a coating of a polymeric material. The print substrate may be an acrylic print substrate, in some examples a coated acrylic print substrate, e.g. coated with a styrene-butadiene co-polymer. The substrate may be a label, which may comprise a support layer and an adhesive layer, with the support layer having electrostatically printed thereon the thermochromic pigment embedded within a layer of thermoplastic resin. A removable release layer may be present on the adhesive, which can be removed prior to use of the label. The substrate may have been printed using an electrostatic printing method and an electrostatic ink composition as described herein. The substrate may be for packaging (i.e. suitable for forming into packaging) or in the form of packaging. The substrate may be a security document.

EXAMPLES

The following illustrates examples of the compositions and related aspects described herein. Thus, these examples should not be considered to restrict the present disclosure, but are merely in place to teach how to make examples of compositions of the present disclosure.

Materials
Pigment:
  Blue ChromaZone FF 31° C. (TMC Hallcrest): thermochromic microparticles that change colour from blue to colourless when heated to the activation temperature of 31° C. The colour starts to fade at approximately 4° C. below the activation temperature, with the colour gradually weakening until the activation temperature is reached. The colour change is reversible and the blue colour is restored upon cooling below the temperature at which the colour starts to fade.

Resins:
  AC-5120 (Honeywell): ethylene-acrylic acid copolymer with an acid number of 112-130 KOH/g.
  Nucrel® 599 (Dupont): a copolymer of ethylene and methacrylic acid, made with nominally 10 wt % methacrylic acid.

Carrier Liquid:
  Isopar L (EXXON): an isoparaffinic oil.

Charge Director:
  NCD: a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Forming the Electrostatic Ink Composition
  A paste was formed by mixing the resins Nucrel 599 and AC-5120 (in a ratio of 95:5) at 30% NVS in the presence of a carrier liquid (Isopar L) in a 1 L reactor (an IKA overhead stirrer, type RE162/P) at 130° C. and 3 rpm for 60 min, allowing the resins to swell. The temperature was then decreased to 80° C. at a rate of 40° C./h (i.e. 40° C./hour). Close to the resins' cloud point, dry thermochromic microcapsules (Blue ChromeZone FF 31° C.) were added at a rate of 20 g/min in an amount suitable to create a thermochromic microcapsule/resin ratio of 3:7. After mixing by stirring (using an IKA overhead stirrer, type RE162/P), high shear mixing (HSM) was commenced to improve the thermochromic microcapsule dispersion. The high shear mixing involved using a T-25 digital ULTRA-TURRAX® high shear mixer @ 5000 RPM. After the cloud point was reached, the rate of cooling was reduced to 10° C./h. At 70° C., the cooling rate was further reduced to 5° C./h. At 60° C., the cooling rate was increased to 10°/h and the dispersion was cooled to ambient temperature. This process resulted in the precipitation of resin-coated thermochromic microcapsules.

The dispersion of resin-coated thermochromic microcapsules was then diluted to 15% NVS by addition of further carrier liquid (Isopar L) and homogenised by HSM apparatus, using T-25 digital ULTRA-TURRAX® high shear mixer at 15,000 rpm for 1 h to create a working dispersion. For use on the printing press, the dispersion was further diluted to 2 wt % NVS using Isopar L, and a charge director (NCD) was then added to the working dispersion to form the thermochromic electrostatic ink. The charge director was added so that the Low Field Conductivity is 120 phmo/cm, which is approximately 25 mg/g by weight solids.

Low field conductivity is the electrical conductivity of the electrostatic ink measured at the following conditions:
Electrical field amplitude: 5-15 V/mm
Frequency: 5-15 Hz
Temperature: 23+/−2 C The cloud point of the resins (combined) were measured by taking a vial of the resins in the isopar (without the thermochromic microcapsules). The vial was heated until only a single phase was seen. The mixture was then cooled at a rate of 2-5° C./hour and the cloud point was the temperature at which the mixture started to become cloudy, i.e. hazy. A thermometer is present in the mixture during the process and the temperature recorded at the cloud point.

The thermochromic electrostatic ink was printed onto standard paper (Condat 115 gsm) by using an Indigo LEP printing press to have a thickness of about ~1 µm. At room temperature, the printed areas were light blue. After the printed areas were pressed for a short period (about 15 seconds) by a human thumb, the temperature increased sufficiently for the ink to become clear and colourless, making the pressed area appear white (the colour of the standard paper used as the printing medium).

While the invention has been described with reference to certain examples, those skilled in the art will appreciate that various modifications, changes, omissions, and substitutions can be made without departing from the spirit of the disclosure. It is intended, therefore, that the invention be limited by the scope of the following claims. Unless otherwise stated, the features of any dependent claim can be combined with the features of any of the other dependent claims and any of the independent claims.

The invention claimed is:

1. An electrostatic ink composition comprising:
a carrier liquid, which has suspended therein:
thermochromic microcapsules having a layer of thermoplastic resin thereon, the thermochromic microcapsules including a polymeric shell encapsulating a color former, a color developer, and a solvent encapsulated within the polymeric shell, wherein the polymeric shell has a lower melt flow rate than a polymer of the thermoplastic resin.

2. The electrostatic ink composition according to claim 1, wherein the carrier liquid has suspended therein a charge director.

3. The electrostatic ink composition according to claim 1, wherein the thermoplastic resin comprises a polymer having acidic side groups.

4. The electrostatic ink composition according to claim 3, wherein the polymer having acidic side groups has a melt flow rate of at least 100 g/10 min.

5. The electrostatic ink composition according to claim 4, wherein the polymer having acidic side groups and having a melt flow rate of at least 100 g/10 min is a co-polymer formed from the polymerisation of ethylene and methacrylic acid.

6. The electrostatic ink composition according to claim 1, wherein the color former comprises a leuco dye and the color developer comprises a proton donor or a proton acceptor.

7. The electrostatic ink composition according to claim 6, wherein the leuco dye is a spirolactone, a fluoran, a spiropyran, or a fulgicide.

8. The electrostatic ink composition according to claim 6, wherein the color developer is the proton donor and the proton donor is bisphenol A, a 1,2,3-triazole derivative, or 4-hydroxycoumarin.

9. The electrostatic ink composition according to claim 1, wherein the thermoplastic resin constitutes 70 wt % to 95 wt % of the solids of the electrostatic ink composition.

10. The electrostatic ink composition according to claim 1, wherein the thermochromic microcapsules are present in an amount from 15 wt % to 50 wt % of the total amount of resin and thermochromic microcapsules together.

11. A method of producing the electrostatic ink composition of claim 1, the method comprising:
providing the carrier liquid having suspended or dissolved therein the thermoplastic resin;
suspending the thermochromic microcapsules in the carrier liquid; and
effecting precipitation of the thermoplastic resin onto the thermochromic microcapsules.

12. The method according to claim 11, wherein the precipitation is effected by temperature reduction.

13. The method according to claim 12, wherein the temperature reduction is carried out at a cooling rate of less than or equal to 50° C./hour.

14. The method according to claim 12, wherein the carrier liquid and the thermoplastic resin are heated to at least the cloud point of the thermoplastic resin in the carrier liquid prior to addition of the thermochromic microcapsules, and before the temperature reduction.

15. The method according to claim 13, wherein the precipitation is effected by reducing the temperature of the carrier liquid to below the cloud point of the thermoplastic resin in the carrier liquid.

16. The method according to claim 11, wherein a charge director is added after precipitation of the thermoplastic resin onto the thermochromic microcapsules.

17. The method according to claim 11, wherein high-shear mixing is performed during and/or after the precipitation.

* * * * *